US012607275B2

(12) United States Patent
Meloy et al.

(10) Patent No.: US 12,607,275 B2
(45) Date of Patent: *Apr. 21, 2026

(54) VALVE BODIES HAVING WEAR RESISTANT INNER CORES

(71) Applicant: Fisher Controls International LLC, Marshalltown, IA (US)

(72) Inventors: Cherra Meloy, Marshalltown, IA (US); James Acton, Roseau, MN (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,832

(22) Filed: Aug. 27, 2024

(65) Prior Publication Data

US 2024/0418284 A1 Dec. 19, 2024

Related U.S. Application Data

(63) Continuation of application No. 17/718,150, filed on Apr. 11, 2022, now Pat. No. 12,085,184.

(51) Int. Cl.
| | |
|---|---|
| *F16K 27/00* | (2006.01) |
| *B22D 19/00* | (2006.01) |
| *F16K 27/02* | (2006.01) |
| *F16L 57/06* | (2006.01) |

(52) U.S. Cl.
CPC .............. *F16K 27/00* (2013.01); *B22D 19/00* (2013.01); *F16L 57/06* (2013.01); *F16K 27/02* (2013.01)

(58) Field of Classification Search
CPC ......... F16K 27/02; F16K 27/00; B22D 19/00; B22D 19/0072; F16L 57/06; F16L 58/00; B33Y 80/00
USPC ................................................. 251/366, 368
See application file for complete search history.

(56) References Cited

U.S. PATENT DOCUMENTS

| | | | |
|---|---|---|---|
| 2,219,471 A | 10/1940 | Davis | |
| 3,446,236 A * | 5/1969 | Waltien | F16K 27/02 |
| | | | 251/368 |
| 4,676,064 A | 6/1987 | Narita et al. | |
| 5,579,823 A | 12/1996 | Mikol et al. | |

(Continued)

OTHER PUBLICATIONS

United States Patent and Trademark Office, "Requirement for Restriction / Election," issued in connection with U.S. Appl. No. 17/718,150, dated May 12, 2023, 5 pages.

(Continued)

*Primary Examiner* — Daphne M Barry
(74) *Attorney, Agent, or Firm* — Hanley, Flight & Zimmerman, LLC

(57) ABSTRACT

Example valve bodies having resistant inner cores are disclosed herein. An example method includes forming a monolithic inner core of a valve body using a first material. The monolithic inner core defines a flow path of the valve body. The monolithic inner core has a thickness that varies between a first wetted portion of the flow path and a second wetted portion of the flow path different than the first wetted portion. The monolithic inner core provides erosion and corrosion resistant characteristics against process fluids. The method further includes overmolding an outer shell of the valve body to the monolithic inner core, the outer shell including a second material different than the first material.

19 Claims, 7 Drawing Sheets

(56)                    References Cited

U.S. PATENT DOCUMENTS

|  |  |  |  |  |
|---|---|---|---|---|
| 9,573,191 B2 | 2/2017 | Jagtap et al. | | |
| 10,220,440 B2 * | 3/2019 | Lai | ........................... | B22C 9/10 |
| 10,711,442 B2 | 7/2020 | Kohler et al. | | |
| 12,085,184 B2 * | 9/2024 | Meloy | ................... | B22D 19/00 |
| 2003/0062088 A1 | 4/2003 | Perla | | |
| 2005/0103389 A1 | 5/2005 | Wei | | |
| 2013/0299028 A1 | 11/2013 | Gossing et al. | | |
| 2017/0175906 A1 | 6/2017 | Martino et al. | | |

OTHER PUBLICATIONS

United States Patent and Trademark Office, "Non-Final Office Action," issued in connection with U.S. Appl. No. 17/718,150, mailed on Sep. 14, 2023, 9 pages.
United States Patent and Trademark Office, "Final Office Action," issued in connection with U.S. Appl. No. 17/718,150, dated Jan. 19, 2024, 12 pages.
United States Patent and Trademark Office, "Notice of Allowance and Fee(s) Due," issued in connection with U.S. Appl. No. 17/718,150, dated May 14, 2024, 9 pages.

\* cited by examiner

700

START

702
MANUFACTURE INNER CORE

704
HEAT TREAT INNER CORE

706
MANUFACTURE MOLD FOR OUTER SHELL

708
PLACE INNER CORE INTO MOLD

710
POUR MOLTEN METAL INTO MOLD HAVING THE INNER CORE TO CREATE AN OUTER SHELL

712
HEAT TREAT THE OUTER SHELL

714
PERFORM SECONDARY PROCESS(ES) TO INNER CORE AND/OR OUTER SHELL TO FORM A VALVE BODY

END

VALVE BODIES HAVING WEAR RESISTANT INNER CORES

RELATED APPLICATION(S)

This patent claims the benefit of U.S. patent application Ser. No. 17/718,150, filed Apr. 11, 2022, which is incorporated by reference herein in its entirety. Priority to U.S. patent application Ser. No. 17/718,150 is hereby claimed.

FIELD OF THE DISCLOSURE

This disclosure relates generally to fluid valves and, more particularly, to valve bodies having wear resistant inner cores.

BACKGROUND

Process units and/or systems like those used in the oil and gas production industry, refining, petrochemical, and other manufacturing facilities typically include process control devices such as fluid valves (e.g., a rotary valve, a sliding stem valve, etc.) to control flow rates and/or pressures of various fluids.

SUMMARY

An example valve body disclosed herein includes a metal core and an exterior shell overmolded with the metal core. The metal core includes a fluid inlet, a fluid outlet, and a fluid passageway extending between the fluid inlet and the fluid outlet. The exterior shell is bonded to the metal core and provides a pressure-boundary of the valve body.

An example valve body disclosed herein includes an inner core made of a first material and an outer shell made of a second material that is different than the first material. The inner core defines a flow path of the valve body between a first port and a second port. The outer shell surrounds the inner core and is bonded to the inner core after formation of the inner core.

An example method of manufacturing a valve body disclosed herein includes manufacturing an inner core of a valve body using a first material having a resistant characteristic and overmolding an outer shell of the valve body with the manufactured inner core. The outer shell includes a second material that is different than the first material.

Figure 1:
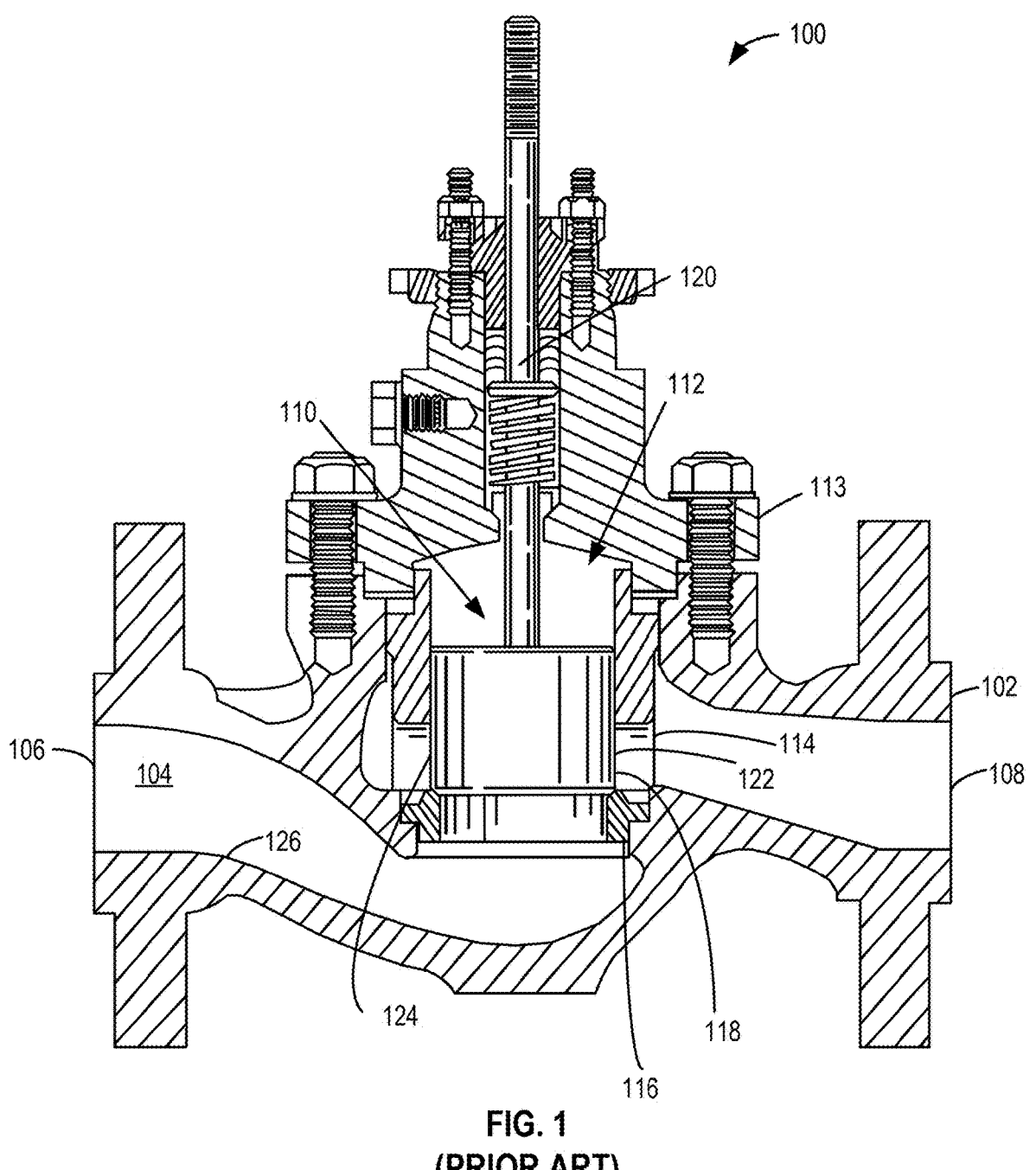
FIG. 1 is a cross-sectional view of a known globe valve.

In general, the same reference numbers will be used throughout the drawing(s) and accompanying written description to refer to the same or like parts. The figures are not to scale. Instead, the thickness of the layers or regions can be enlarged in the drawings. Although the figures show layers and regions with clean lines and boundaries, some or all of these lines and/or boundaries can be idealized. In reality, the boundaries and/or lines can be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that cannot be exact due to manufacturing tolerances and/or other real world imperfections.

DETAILED DESCRIPTION

Many known process control and/or fluid distribution systems (e.g., power generation systems, petroleum refinery systems, etc.) employ process control devices or field devices to control a flow of fluid. For example, valves are a common type of process control device used to control fluid flow (e.g., liquids, gases, etc.) between an upstream source and a downstream location of a process system. After a period of operation, in some instances, portions of the valve assembly (e.g., an internal surface, a wetted surface, etc.) that encounter the process fluid can experience material degradation or wear. As used herein, the term "wear" generally means erosion and/or corrosion (e.g., on surfaces of fluid valves). For example, in process control systems having process fluids with particulate or entrained solids (e.g., petroleum and natural gas applications), erosion of the valve body, and other components of the valve assembly, can occur even if the valve body is composed of corrosion resistant material(s) or alloy(s). For example, for petroleum and natural gas process systems, nickel-based alloys are more corrosion resistant and do not have environmental restrictions in accordance with the Association for Materials Protection and Performance (AMPP) (e.g., formerly known as NACE International) specification NACE MR0175/ISO 15156. Accordingly, valves are manufactured from materials that meet the erosion or corrosion resistant properties (e.g., and/or other properties) for a given application.

However, nickel-based alloys and/or other wear resistant materials include one or more elements that can be in short supply and, thus, tend to be more expensive than other materials (e.g., carbon steel). To manage costs associated with process control systems, valves can be manufactured using carbon steel and then undergo a cladding process to apply (e.g., add, deposit, etc.) a material to one or more internal surfaces of the valve body to provide corrosion and/or erosion resistant properties to those internal surfaces of the valve body, which are exposed to process fluid flowing through the valve. The cladding can be applied to all of the internal surfaces of the valve body or at least a portion of internal surfaces that come into contact with (e.g., are exposed to) process fluid.

While cladding can be effective for certain valve bodies, valve size limits the application of cladding. For instance, cladding is a welding process that requires a machine or welder to access internal surfaces of the valve body. Thus, cladding cannot be applied to valve bodies that are too small to receive a tool (e.g., a weld rod) to weld the cladding material to internal surfaces of the valve body. Thus, sizes (e.g., diameters) of an inlet, an outlet, a head port (e.g., to receive a trim assembly and/or another valve component), and/or a bore area of the valve body factor into whether cladding can be applied.

Thus, smaller sized valve bodies that are not candidates for cladding, due to insufficient access to internal surfaces of the valve body, are often manufactured as a solid or single cast material. As used herein, a small valve (e.g., small valve body) refers to a valve that cannot receive cladding. Currently, valves that cannot receive cladding are manufactured to include a solid corrosion resistant body. That is, the entire valve body is made of material(s) having high corrosion resistance. As noted above, these materials (e.g., nickel-based alloys) are often associated with higher costs than other materials (e.g., carbon steel) that are less corrosion resistant. Accordingly, valve bodies that cannot receive cladding often have higher material costs than larger valve bodies that can receive cladding.

In some examples, valves used in some industries or applications (e.g., oil and gas industries or applications) handle process fluids that include heavy particulate or entrained solids, which can experience erosion of internal surfaces of a valve body. However, a valve body cannot be made entirely of an erosion resistant material. For example, materials having high erosion resistance may not be able to withstand a pressure and/or temperature of a process fluid and, thus, do not have published pressure-temperature ratings or classifications in national Codes and Standards (e.g., standards developing organizations, such as the American Society of Mechanical Engineers (ASME)(e.g., see ASME B16.34)). For example, erosion resistant materials (e.g., a valve body composed of an alloy such as a cobalt alloy containing additions of nickel, chromium, tungsten, and molybdenum) can have lower ductility characteristics than materials typically used for pressure-retaining components and, thus, can be susceptible to failure due to the brittle nature of these materials. Valve bodies are considered pressure-boundary components of the process system because the valve body contains pressure from the process fluid.

Some known valves employ a valve body having a high strength material such, for example, carbon steel, and an insert or liner composed of a ceramic. However, applications in which a ceramic liner can be used are limited by a size and/or geometry of the valve body. For example, the ceramic liner cannot be inserted into a valve body that has a complex geometry or flow path. Further, as discussed above, valve body openings (e.g., an inlet, an outlet, a head port, a shaft bore, etc.) must be large enough to enable insertion of the ceramic liner into the valve body. Additionally, ceramic liners are often expensive and, thus, can be cost prohibitive in certain applications.

Examples disclosed herein enable manufacture of a multi-piece (e.g., a two-piece) valve body. An example valve body disclosed herein includes an inner core (e.g., a liner, insert, etc.) composed of a first material having a wear resistant property and an outer shell (e.g., casing, exterior shell, etc.) composed of a second material different than the first material to meet pressure and/to temperature rating requirements. For example, the inner core can be composed of a material having corrosion resistant properties, erosion resistant properties, and/or any other wear resistant properties. The inner core, which defines wetted surfaces to be exposed to process fluids, provides a wear resistant barrier of a valve body to the process fluid. In examples disclosed herein, the inner core can be manufactured from a material having a desired wear resistant property. In some examples, the inner core can be manufactured using a corrosion resistant material, such as a nickel-based alloy, and the outer shell can be manufactured from carbon steel. Thus, the inner core provides a corrosion resistant property. In some examples, the inner core can be manufactured using corrosion and erosion resistant material, such as a cobalt-based alloy. Thus, the inner core can provide corrosion and erosion resistant properties.

Examples of inner cores disclosed herein can be manufactured using an additive manufacturing process, such as three-dimensional (3D) metal printing. For example, an inner core disclosed herein can be manufactured using a laser powder bed fusion process. However, other methods can be used to manufacture the example inner cores disclosed herein including, for example, casting, etc. Examples disclosed herein enable manufacture of valve bodies having more complex geometries while maintaining wear resistant properties. For example, manufacture of the inner core using the additive manufacturing process enables creation of inner cores that have geometries that cannot be formed using casting manufacturing processes, cladding processes, and/or any other manufacturing processes.

Example valve bodies disclosed herein include an outer shell surrounding the inner core. In some examples, the outer shell is made of high strength material, such as carbon steel. In examples disclosed herein, the outer shell is manufactured by casting a material (e.g., a metal) around the inner core after formation of the inner core. For example, metal can be melted in a furnace and poured into a casting mold containing the inner core. The molten metal disperses around the inner core, bonding to the inner core as the metal cools and hardens. It is understood, however, that other processes can be used to manufacture the outer shell, such as additive manufacturing, etc. In some examples, the inner core has an outer surface with a rough surface finish (e.g., as a result from the 3D printing process), which facilitates or enhances bonding between the outer shell and an outer surface of the inner core.

In some examples, the inner core is composed of a first material having a first corrosion and/or erosion resistance characteristic and the external shell is composed of a second material having a second corrosion and/or erosion resistance characteristic that is different than (e.g., a lower degree of corrosion and/or erosion resistance) the first corrosion and/or erosion resistance characteristic of the first material. Additionally, example exterior shells disclosed herein can be formed over the inner core via an insert molding manufacturing process. In other words, the inner core, defining an interior flow path of a valve body, is made prior to formation of the exterior shell of the valve body. Thus, the fluid flow passageway of the valve body is fabricated prior to an exterior surface of the valve body. In some examples, the exterior shell can be overmolded with the inner core. As disclosed herein, overmolding (e.g., an overmolding injection molding process) is a process in which two or more materials are combined through a molding process to generate one part (e.g., product, item, etc.). In other words, a first portion (e.g., a substrate) of the part is formed using a first process, such as injection molding, 3D printing, etc. A second portion (e.g., an overmold) of the part is formed over the substrate using a second process, such as casting, injection molding, etc., to form the final part. The substrate and the overmold can be formed using the same or different materials. In some examples, the first process can be the same as the second process.

Examples disclosed herein can replace the cladding process by manufacturing a wear resistant metal inner core as an internal surface of the valve body. In other words, the inner core is a hollow liner made of a material having corrosion and/or erosion resistant characteristics that are greater than the corrosion and/or erosion resistant characteristics of a material used to manufacture the outer shell. The valve body is manufactured by forming (e.g., manufacturing, adding, depositing, etc.) the outer shell around the liner. Examples disclosed herein enable manufacture of a small valve body having internal wear resistant properties that can be more cost effective than current small valve bodies.

In some examples, techniques disclosed herein can be applied to a sliding stem valve having a port region size having a diameter that is less than 6 inches. In some examples, techniques disclosed herein can be applied to a rotary valve that includes a shaft bore having a diameter that is less than 3 inches. While examples disclosed herein are discussed in terms of small valve bodies that cannot undergo a cladding process, examples disclosed herein can be applied to any size valve body (e.g., large valve bodies for which cladding is available). In some examples, a size of a valve body constructed in accordance with the teachings of this disclosure may only be limited by a size of a machine or other tool used to manufacture the valve body, such as a build box volume of a 3D printing machine. Further, examples disclosed herein can be applied to any type of valve, including globe valves, rotary valves, butterfly valves, gate valves, check valves, and/or any other fluid control device(s).

FIG. 1 illustrates a cross-sectional view of a known control valve 100 (e.g., sliding-stem valve) within which examples disclosed herein can be implemented. The control valve 100 of FIG. 1 includes a valve body 102 defining a fluid passageway 104 between a fluid inlet 106 and a fluid outlet 108. The fluid inlet 106 and fluid outlet 108 define ports through which a process fluid can enter and exit the valve body 102, respectively. The control valve 100 includes a trim assembly 110 positioned in the fluid passageway 104 of the valve body 102 between the fluid inlet 106 and the fluid outlet 108. The trim assembly 110 is positioned in the valve body 102 via a head port 112 (e.g., an opening perpendicular to the fluid inlet 106 and/or the fluid outlet 108) of the valve body 102. A bonnet 113 couples to the valve body 102 and retains the trim assembly 110 in the valve body 102.

The trim assembly 110 includes a cage 114, a valve seat 116, and a valve plug 118 (e.g., fluid control member). The valve plug 118 is slidably disposed in a cavity of the cage 114 and movable relative to the valve seat 116 (e.g., and the cage 114) to control fluid flow through the fluid passageway 104. To move the valve plug 118 relative to the cage 114, the valve plug 118 is coupled to an actuator (not shown) via a valve stem 120. The actuator moves the valve plug 118 in a first direction (e.g., an upward direction in the orientation of FIG. 1) away from the valve seat 116 to an open position to allow fluid flow from the fluid inlet 106 to the fluid outlet 108 via the fluid passageway 104. Conversely, the actuator moves the valve plug 118 in a second direction (e.g., in a downward direction in the orientation of FIG. 1) toward the valve seat 116 to a closed position to prevent or restrict fluid from flowing between the fluid inlet 106 and the fluid outlet 108. In some examples, the flow direction can be reversed (e.g., the fluid flows through the valve body 102 from the fluid outlet 108 to the fluid inlet 106). In some examples, the control valve 100 can be positioned in a partially open position or in a partially closed position (e.g., between a fully open position and a fully closed position) to control the flow rate through the control valve 100.

The valve plug 118 of FIG. 1 has a solid (e.g., contiguous) sidewall 122. The valve plug 118 moves within a cavity of the cage 114 between a closed position such that the sidewall 122 covers an opening 124 of the cage 114 to prevent or restrict fluid flow through the fluid passageway 104 when the valve plug 118 engages the valve seat 116 and an open position such that the sidewall 122 uncovers the opening 124 to allow fluid flow through the fluid passageway 104 when the valve plug 118 disengages from the valve seat 116.

As the process fluid flows through the fluid passageway 104, the process fluid contacts an internal surface 126 (e.g., a wetted surface) of the valve body 102. In some examples, when the valve body 102 is composed of carbon steel and has lower erosion resistant properties, the process fluid entrained with particulate can erode the internal surface 126 of the valve body 102, which can cause fluid leakage to the environment and/or affect fluid flow characteristics (e.g., cause turbulent flow, noise, etc.). In some examples, the process fluid reacts with the internal surface 126 of the valve body 102, which can cause corrosion to the internal surface 126. Accordingly, a corrosion and/or erosion resistant material is often provided on the internal surface 126 of the valve body 102 via a cladding process. As noted above, the cladding process involves welding the wear resistant material to the internal surface 126 of the valve body 102. Thus, cladding can only be applied to valve bodies having ports (e.g., the fluid inlet 106, the fluid outlet 108 and the head port 112) large enough to enable access by welding equipment.

Figure 2:
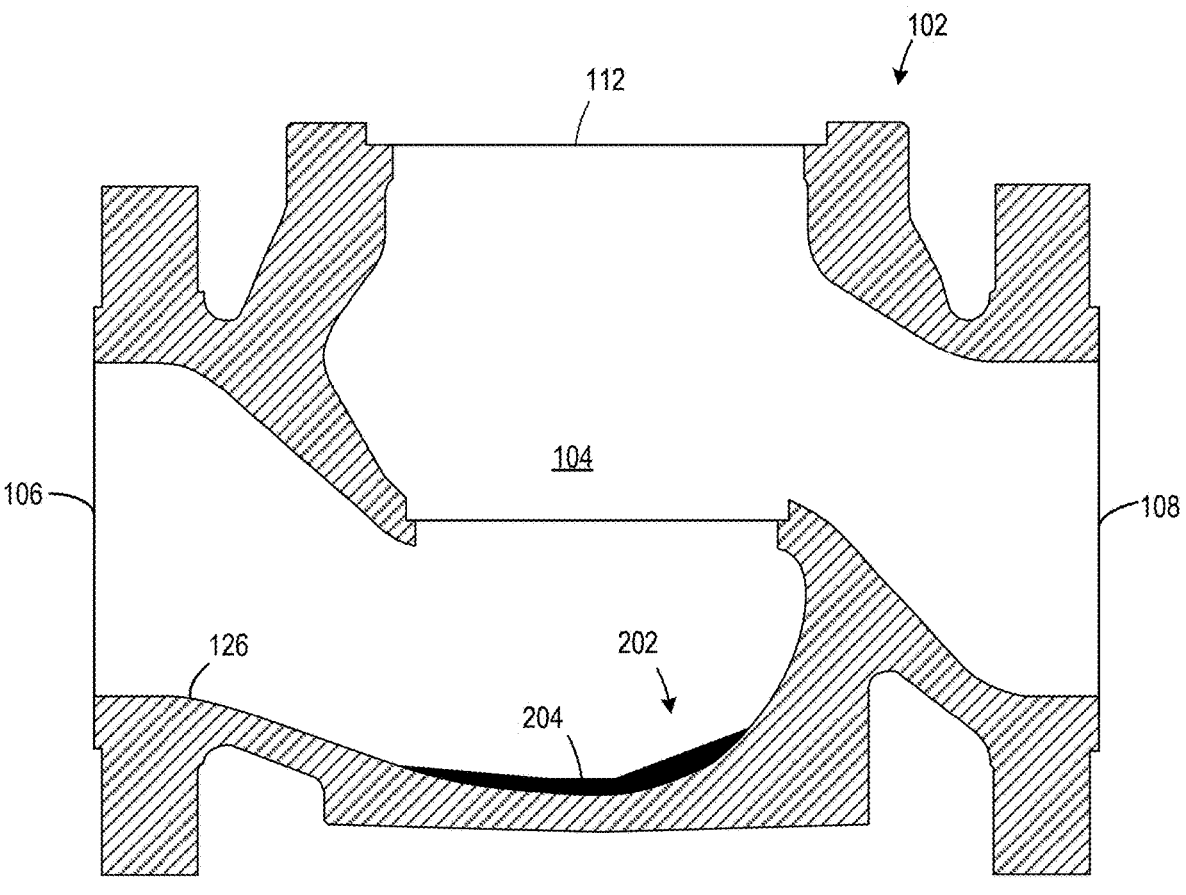
FIG. 2 is a cross-sectional view of a valve body of the globe valve of FIG. 1.

FIG. 2 is schematic cross-sectional view of the valve body 102 of FIG. 1. In the illustrated example of FIG. 2, the flow associated with the process fluid can include particulate that can erode the internal surface 126 of the valve body 102. However, the size of the fluid inlet 106, the fluid outlet 108, and the head port 112 of FIG. 2 are too small to enable access by a welding rod to deposit an erosion resistant material via, for example cladding. To provide some erosion resistant material to the internal surface 126, an erosion resistant material 202 is deposited onto a region or portion 204 of the internal surface 126 (e.g., at a bottom) of the valve body 102 that is accessible by the welding rod. That is, the erosion resistant material 202 (e.g., cladding material) is applied to the portion 204 of the internal surface 126 via a welder provided through the head port 112. Thus, the erosion resistant material 202 and/or the portion 204 of the internal surface 126 is only applied to internal surface that are directly below the head port 112.

Due to the cladding, the portion 204 of the internal surface 126 has greater erosion characteristics than the portion of the internal surface 126 that does not include the erosion resistant material 202 (e.g., than the rest of the internal surface 126 of the valve body 102). This can be useful in instances in which the portion 204 of the valve body 102 experiences relatively more wear in certain areas (e.g., at a bottom of the fluid passageway 104). However, pooling erosion resistant material 202 at the portion 204 of the valve body 102 is not useful in examples in which other surfaces (e.g., wetted surfaces) of the internal surface 126 of the valve body 102 experience significant erosion. In such examples, the valve body 102 would need to be manufactured entirely from the erosion resistant material, which can increase manufacturing costs. Further, the erosion resistant material may not meet a pressure-temperature rating requirement.

Figure 3:
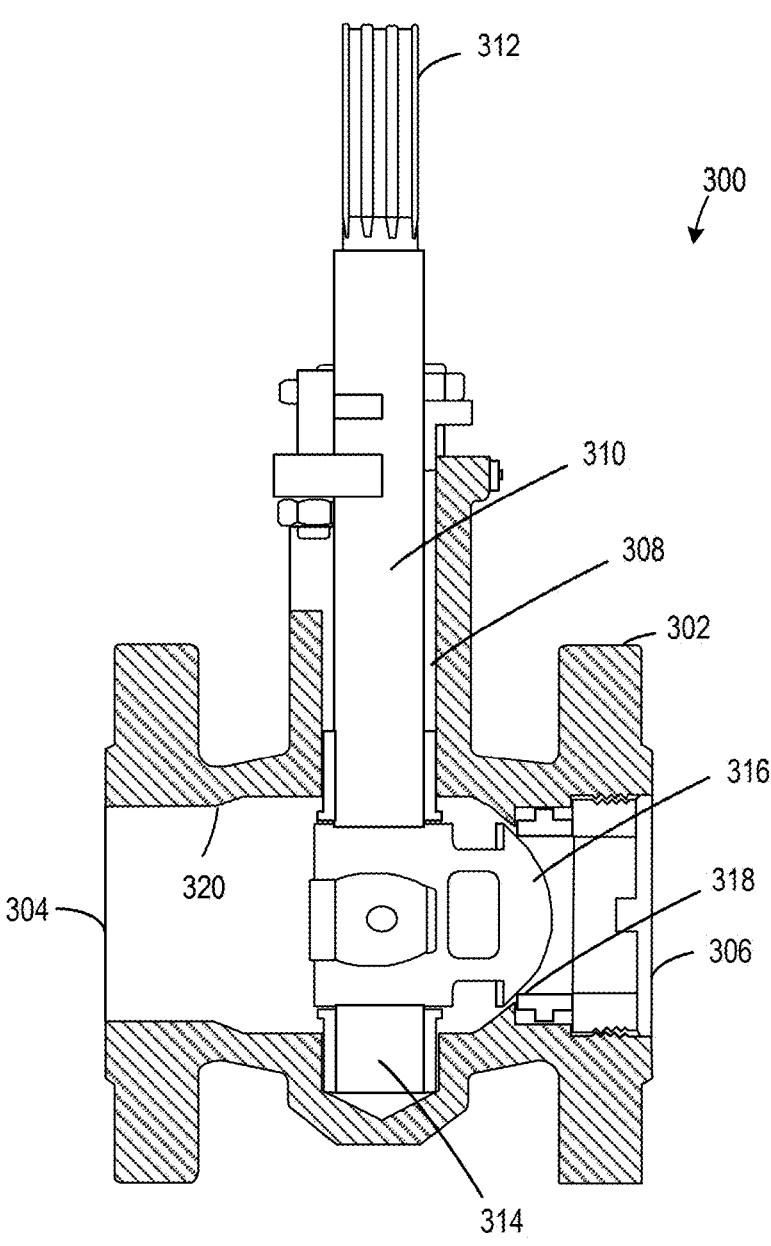
FIG. 3 is a cross-sectional view of a known rotary valve.

FIG. 3 depicts an example known rotary valve 300 within which examples disclosed herein can be implemented. The rotary valve 300 includes a valve body 302 defining an inlet 304, an outlet 306 and a bore 308 that receives a shaft 310. A first end 312 of the shaft 310 extends from the valve body 302 and is is to be coupled to an actuator (not shown). A second end 314 of the shaft 310 extends into the valve body 302 and has a fluid flow control member 316 coupled thereto. In operation, an actuator rotates the shaft 310 (e.g., 90 degrees, etc.) to move the fluid flow control member 316 relative to and/or into engagement with a seating surface or seat ring 318 to control fluid flow through the rotary valve 300.

As a process fluid flows through between the inlet 304 and the outlet 306, the process fluid comes into contact with an internal surface 320 (e.g., a wetted surface) of the valve body 302. In some examples, wear can result from such contact. As noted above, a cladding process can be applied to add wear resistant material to the internal surface 320 of the valve body 302. However, the cladding process can only be applied to the portions of internal surfaces 320 of the valve body 302 that a welder can access to deposit (e.g., weld) the resistant material. Access points to the internal surface 320 of the valve body 302 include the ports (e.g., the inlet 304 and the outlet 306) and a region defined by the bore 308. As such, a size of the inlet 304, outlet 306, and/or the bore 308 can limit or prevent application of the cladding process to portions of the internal surface 320 of the valve body 302.

Figure 4:
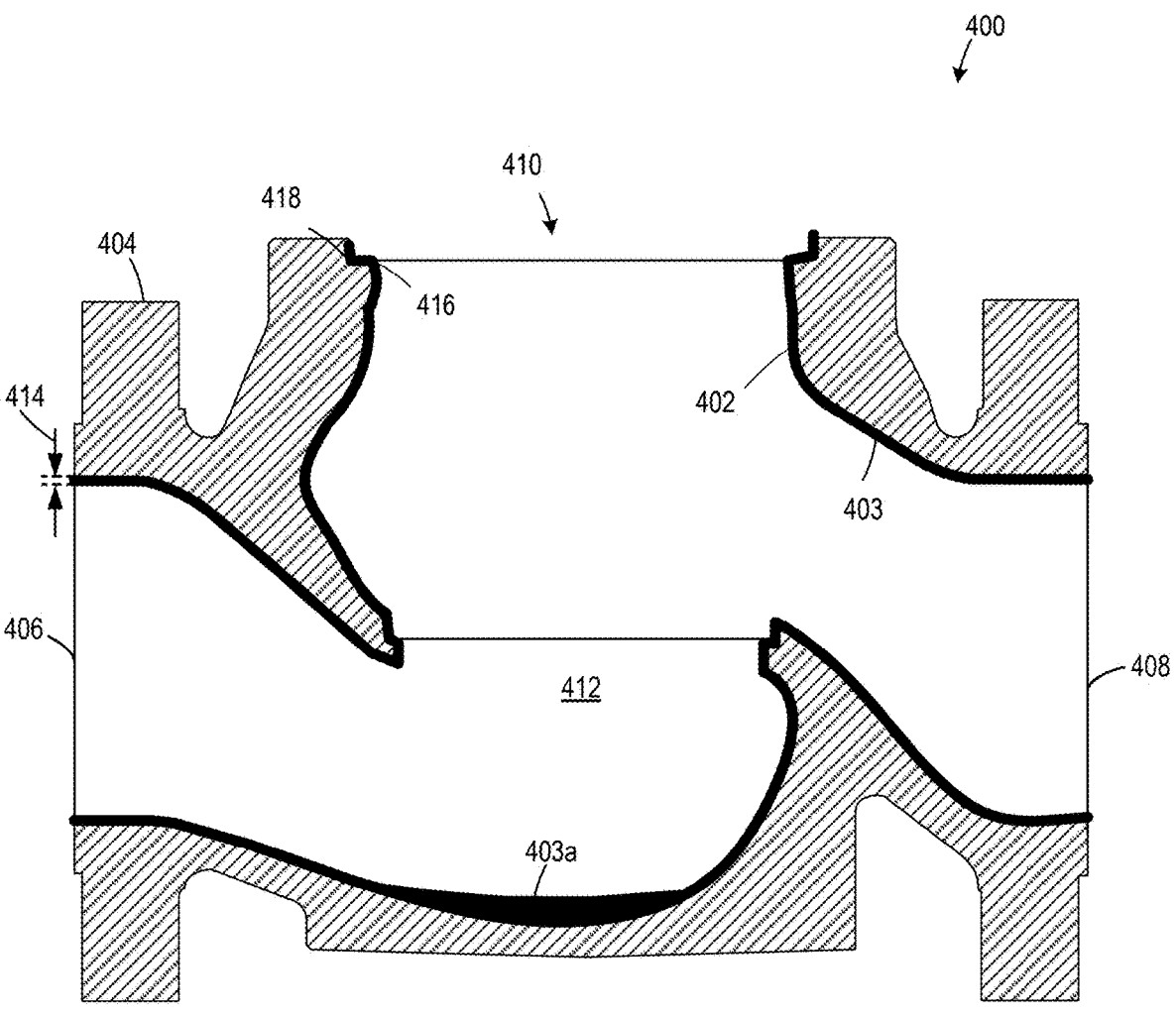
FIG. 4 is a cross-sectional view of an example valve body constructed in accordance with the teachings of this disclosure.

FIG. 4 is a cross-sectional view of an example valve body 400 constructed in accordance with teachings of this disclose. The valve body 400 can be used to implement a valve of a process control system to provide flow control of a process fluid. In the illustrated example of FIG. 4, the valve body 400 corresponds to a valve body of a sliding stem valve. For example, the valve body 400 can be used in place of the valve body 102 of FIG. 1. For instance, the valve body 400 can receive the valve trim assembly 110 and the bonnet 113 of FIG. 1 to define a fluid valve. However, examples disclosed in relation to FIG. 4 are not limited to globe or sliding stem valves and can additionally or alternatively be applied to a valve body of another control valve, such a rotary valve, a butterfly valve, etc.

The valve body 400 of the illustrated example includes an inner core 402 (e.g., an internal surface of the valve body 400) and an example outer shell 404 (e.g., an exterior shell, an exterior surface of the valve body 400). The inner core 402 of the illustrated example is enclosed or encased (e.g., completely surrounded by) the outer shell 404. The inner core 402 of the illustrated example is made of a first material and the outer shell 404 of the illustrated example is made of a second material different than the first material. For example, the first material can include wear resistant (corrosion and/or erosion) characteristics that are greater than wear resistant (corrosion and/or erosion) characteristics of the second material. In some examples, the first material is an alloy (e.g., a cobalt alloy, a nickel alloy, etc.) and the second material is carbon steel. The valve body 400 of the illustrated example includes an example inlet 406, an example outlet 408, and an example head port 410 (e.g., an opening). A size (e.g., a diameter) of each of the inlet 406, the outlet 408, and/or the head port 410 of the valve body 400 of FIG. 4 is too small to enable a welding tool or rod to apply cladding to the entire internal surface of the valve body 400. For example, the inlet 406, outlet 408, and head port 410 may each have a diameter that is less than 6 inches. Thus, cladding cannot be applied to many portions of the internal surface of the valve body 400. The valve body 400 includes the inner core 402 (e.g., a liner, an insert), which defines an internal surface 403 (e.g., wetted surfaces) of the valve body 400. In other words, the inner core 402 defines a passageway 412 (e.g., flow path, pathway, etc.) through which the process fluid can flow.

The inner core 402 of the illustrated example has a thickness 414 (e.g., a distance) between an inner surface 416 of the inner core 402 and an outer surface 418 of the inner core 402 opposite the inner surface 416. In some examples, the thickness 414 of the inner core 402 is substantially homogenous (e.g., perfectly homogenous, or within 10 percent of perfectly homogenous) throughout the valve body 400 to ensure one area or portion of the inner core 402 does not corrode and/or erode more relative to another area or portion of the inner core 402. However, the thickness 414 of the inner core 402 can be manufactured to vary in some examples (e.g., vary greater than 10 percent between a first portion of the inner core 402 and a second portion of the inner core 402 different than the first portion). For example, the thickness 414 of the inner core 402 can be greater in an area or portion 403a of the internal surface 403 of the valve body 400 that is subjected to a greater amount of wear. In some examples, the thickness 414 of the inner core 402 is at least 3/16 of an inch or any other thickness (e.g., to meet on customer requests) In some examples, the thickness 414 of the inner core 402 can be manufactured to be greater than what is required for the valve body 400 to prevent a molten metal (e.g., corresponding to the outer shell 404) from melting completely or entirely through (e.g., the thickness 414) the inner core 402 during manufacture. In some examples, the thickness 414 of the inner core 402 can be determined on a design-by-design basis to conform to a specific application.

In the illustrated example of FIG. 4, the inner core 402 is manufactured using an additive manufacturing process. For example, the inner core 402 of FIG. 4 can be manufactured using a laser powder bed fusion process. The inner core 402 provides the wear resistant properties for the valve body 400 and, thus, the inner core 402 can be manufactured using a first material having a desired wear resistant property. For example, the inner core 402 can be manufactured using a corrosion, erosion and/or a combination of a corrosion and erosion resistant material(s) (e.g., a nickel or cobalt alloy). Thus, the inner core 402 is fabricated or made prior to formation of the outer shell 404.

In many instances, the valve body 400 and/or other components of the control process system must comply with standards, such as those created by AMPP. AMPP is an international organization that publishes requirements for the upstream oil and gas industry. For example, standard NACE MR0175/ISO 15156 sets requirements for materials used for components of a control process system that services process fluid containing hydrogen sulfide (H2S) because H2S can cause cracking and other types of corrosion in control process system components made of high hardness or tensile strength (e.g., valve bodies composed solely of carbon steel). NACE MR0175/ISO 15156 places environment limits on materials such as austenitic and duplex stainless steels. As a result, oil and gas industries often prefer to use a nickel-based alloy for control process system components in applications with high H2S concentrations as the nickel-based alloy does not have environmental limits per NACE MR0175/ISO 15156. Accordingly, some inner cores 402 are manufactured using a nickel-based alloy.

In some applications, the process fluid contains heavy particulate and/or entrained solids that disperse throughout the control process system. In such applications, a valve body can be susceptible to erosion. Thus, the inner core 402 can be manufactured with materials having both erosion and corrosion resistant characteristics. For example, a wear resistant alloy such as a cobalt-based alloy (which is erosion resistant) containing additions of nickel, chromium, tungsten, and molybdenum (for increased corrosion resistance) can be used.

After the inner core 402 is manufactured (e.g., via a laser powder bed fusion process), the inner core 402 can be heat treated to achieve the desired wear resistant properties and/or other material properties. Materials (e.g., metals, metal alloys, etc.) undergo heat treatment to enhance (e.g., improve, increase) material characteristics of the material to adapt to a specific application in which the material is to be used. The heat treatment can include stress relieving, annealing, solution annealing, age hardening, etc. In some examples, the inner core 402 can be subjected to more than one heat treatment and/or any other heat treatment(s) or post processing technique(s).

After the inner core 402 is manufactured (e.g., and, if desired, heat treated), the outer shell 404 is fabricated and coupled to the inner core 402 to define the valve body 400. In other words, the outer shell 404 is fabricated subsequent to the inner core 402. The outer shell 404 of FIG. 4 can be manufactured using a sand casting process. Thus, the inner core 402 of the illustrated example is manufactured via a first manufacturing technique and the outer shell 404 of the illustrated example is manufactured via a second manufacturing technique different than the first manufacturing technique. However, in some examples, the outer shell 404 can be manufactured using additional or alternative processes such as additive manufacturing, shell molding, investment casting, sand casting, etc. The sand casting process includes pouring molten metal into a sand cast mold having a mold cavity. The sand cast mold can be made of a sand mixed with a bonding agent (e.g., clay) and a liquid (e.g., water) and/or other material(s) or agent(s). In this example, the sand cast mold is a 3D printed sand mold. However, other manufacturing processes can be used additionally or alternatively to manufacture the sand cast mold, such as using a standard pattern to create the sand cast mold.

The sand cast mold includes a gating system. For example, the gating system can include a pouring cup for pouring the molten metal and gates (e.g., tunnels) structured to funnel the molten metal into the mold cavity. Using a 3D printing process for the sand cast mold enables creation of more complex gating set-ups than the standard pattern.

Further, 3D printing the sand cast mold can allow a manufacturer to change the gating set-up more easily than a standard pattern.

The outer shell 404 of the illustrated example of FIG. 4 is made of carbon steel. In additional or alternative examples, the outer shell 404 can be made using any suitable material that meets industry requirements (e.g., application specific requirements, standards, codes, etc.) such as those discussed above to achieve pressure and/or temperature parameters or classifications. For example, the outer shell 404 can be manufactured using austenitic stainless steel, a low alloy steel, etc. To couple the inner core 402 and the outer shell 404 and form the valve body 400, the inner core 402 is placed into a cavity of a sand cast mold that is used to form the outer shell 404. Carbon steel is heated (e.g., in a furnace) to a melting point of the carbon steel to produce molten carbon steel (e.g., liquid metal). The molten carbon steel is poured into the sand cast mold having the inner core 402 located in a cavity of the mold. The molten carbon steel is dispersed around the inner core 402 via a gating system. As the molten carbon steel cools, the molten carbon steel hardens into a solid material to form the outer shell 404.

The outer shell 404 serves as the pressure-boundary component of the valve body 400. Accordingly, the outer shell 404 can be provided with a thickness in accordance with requirements set forth by a standards developing organization, such as ASME B16.34. The maximum thickness of the outer shell 404 is determined by the sand cast mold. However, the outer shell 404 can be machined to decrease the thickness about the entire outer shell and/or in specific regions of the outer shell 404.

The inner core 402 of the illustrated example is at least partially metallurgically bonded to the outer shell 404 to ensure that the inner core 402 and the outer shell 404 (e.g., composed of different materials) do not separate or pull apart during operation. The inner core 402 is manufactured using a laser powder bed fusion process. As a result, an outer surface of the inner core 402 has a relatively rough surface finish, which facilitates a bonding (e.g., a metallurgical bonding) between the outer surface 418 of the inner core 402 and the inner surface of the outer shell 404. That is, the rough surface finish of an outer surface 418 of the inner core 402 is such that the molten carbon steel adheres (e.g., bonds or attaches) to the outer surface of the inner core 402. As the molten carbon steel cools, it solidifies and attaches to the inner core 402. Thus, a gap is not formed between the inner core 402 and the outer shell 404. Thus, the inner core 402 is completely encased within the outer shell 404 and defines an entire internal surface (e.g., all of the wetted surfaces) of the valve body 400. Thus, the inner surface of the valve body 400 is manufactured prior to an exterior surface of the valve body 400.

In some examples, the outer shell 404 cannot bond to the inner core 402 entirely. In such examples, at least enough bonding occurs so that the inner core 402 does not separate from the outer shell 404 (e.g., during operation). In other examples, the inner core 402 and the outer shell 404 bond in regions in which the inner core 402 is exposed to the process fluid. In such regions, the bonding is such that there are no gaps between the inner core 402 and outer shell 404. If a gap exists between the inner core 402 and outer shell 404, the process fluid can enter the gap. This can create an area of relatively greater wear. Thus, bonding is needed such that gaps between the inner core 402 and outer shell 404 are non-existent or at least limited. In some examples, the valve body 400 is machined to achieve a desired valve body shape as describe below.

After the outer shell 404 has been poured and allowed to cool, the outer shell 404 can be heated treated. In some examples, the outer shell 404 is heat treated to improve or enhance material properties of the outer shell 404. In some examples, the outer shell 404 is heat treated to meet material specification requirements for a pressure-boundary component. The heat treatment can include stress relieving, annealing, solution annealing, etc. In some examples, the outer shell 404 can be subjected to more than one heat treatment and/or any other post manufacturing or secondary process(es).

Figure 5:
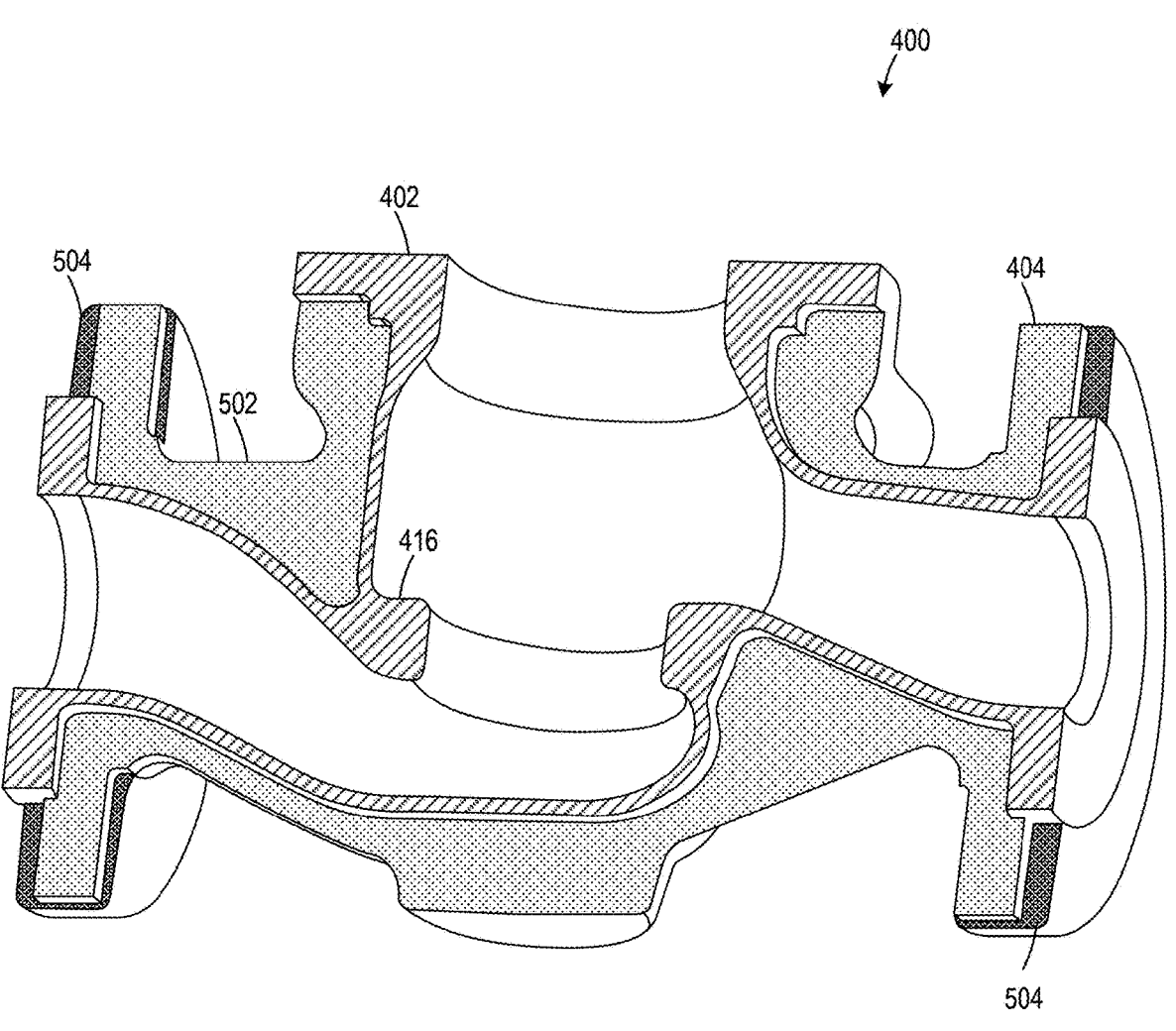
FIG. 5 is a cross-sectional view of the example valve body of FIG. 4.

FIG. 5 illustrates a cross-sectional view of the example valve body 400 of FIG. 4, including the example inner core 402 and the example outer shell 404 constructed in accordance with the teachings of this disclose. FIG. 5 illustrates example machining that can be performed after formation of the valve body 400. In some examples, the inner core 402 is machined. For example, the inner core 402 can be machined to create a gasket face (e.g., for a bonnet gasket, a seat ring gasket, etc.). In some examples, the inner surface 416 of the inner core 402 is machined to create a desired (e.g., smooth) surface finish at a sealing surface. For example, the inner surface 416 of the inner core 402 can be machined to create a smooth sealing surface for a seat ring gasket.

In some examples, the outer shell 404 is machined. The outer shell 404 can be machined to create a specific surface finish and/or to create a desired shape of the valve body 400. A shape of the valve body 400 is defined by an outer surface 502 or perimeter of the outer shell 404. In the illustrated example of FIG. 5, excess carbon steel 504 remains on the valve body 400 after the casting process. As such, the excess carbon steel 504 can be removed via machining to achieve the desired shape of valve body 400. That is, the excess carbon steel 504 can be machined to shape the outer surface 502 of the outer shell 404.

It is understood that any portion of the valve body 400 can be machined after formation of the valve body 400. The machining can be accomplished using at least one subtractive manufacturing process, such as drilling, boring, broaching, etching (e.g., chemical etching), sanding, grinding, etc. In some examples, more than one machining process or other secondary or post manufacturing process can be used. It is understood that any suitable machining process can be used to machine the portion of the valve body 400.

Figure 6:
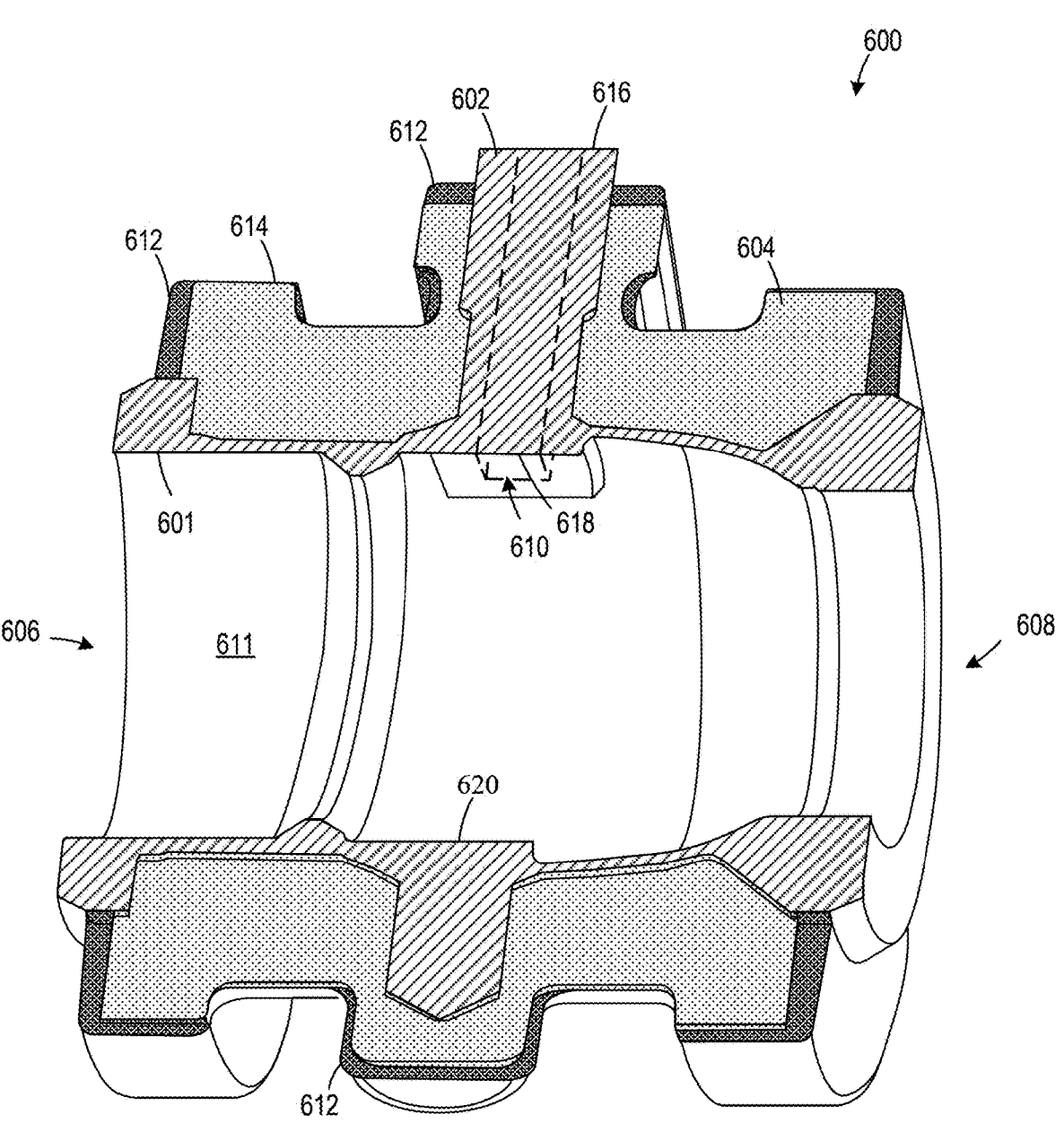
FIG. 6 is a perspective view of another example valve body constructed in accordance with the teachings of this disclosure.

FIG. 6 illustrates an example rotary valve body 600 including an inner core 602 and outer shell 604 in accordance with teachings of this disclosure. The inner core 602 of the illustrated example is enclosed or encased (e.g., substantially surrounded by) the outer shell 604. The inner core 602 of the illustrated example is made of a first material and the outer shell 604 of the illustrated example is made of a second material different than the first material. For example, the first material can include wear resistant characteristics that are greater than wear resistant characteristics of the second material. In some examples, the first material is an alloy (e.g., a cobalt alloy, a nickel alloy, etc.) and the second material is carbon steel, etc.

The valve body 600 includes an example inlet 606, an example outlet 608, and an example shaft bore 610 (which is to be machined, as described below). The inner core 602 defines an internal surface 601 (e.g., wetted surfaces) of the valve body 600. The inner core 602 also defines a passageway 611 (e.g., flow path, pathway, etc.) between the inlet 606 and outlet 608 through which the process fluid can flow. The inner core 602 and outer shell 604 are at least partially metallurgically bonded such that the inner core 602 does not move relative to the outer shell 604. For example, the outer shell 604 may be manufactured by casting molten carbon steel around the inner core 602 (e.g., using a sand cast mold), which is bonded to the inner core 602 as the molten carbon steel cooled and hardened.

The inner core 602 and/or the outer shell 604 can be heat treated to achieve the desired wear resistant properties and/or other material properties. For example, the inner core 602 can be manufactured (e.g., 3D printed) and heat treated, and then placed into a mold in which the outer shell 604 is overmolded to the inner core 602. The outer shell 604 can then be heat treated. An inner core 602 thickness and/or the outer shell 604 thickness can be manufactured to be in accordance with requirements set forth by a standards developing organization.

In the illustrated example of FIG. 6, the valve body 600 is machined to achieve a desired valve body shape. In some examples, the outer shell 604 is machined to create a specific surface finish and/or to create a desired shape of the valve body 600. That is, excess carbon steel 612 that remains on the valve body 600 after the casting process be removed (e.g., via a subtractive manufacturing process) to achieve the desired shape of valve body 600. A shape of the valve body 600 is defined by an outer surface 614 or perimeter of the outer shell 604.

In some examples, the inner core 602 is machined. In some examples, the inner core 602 is machined to create a specific surface finish for gasket surface and/or to fabricate a gap for a seal. For example, the inner core 602 can be machined to create a gasket face on which a ball can seal. In some examples, a surface of the inner core 602 is machined at a region in which a gasket line will be positioned. In some examples, the inner core 602 can be machined to generate the shaft bore 610. For example, the inner core 602 can be machined at a region of the shaft bore 610, from a first surface 616 of the inner core 602, through the inner core 602, and out a second surface 618 of the inner core 602. Further, the inner core 602 can also be machined at a third surface 620, into the inner core 602 towards a desired depth. For example, the depth can correspond to a shaft end that will be inserted into the shaft bore 610. Dimensions of the machining are at least partially determined by a desired size of the shaft bore 610 and the size of the shaft that will be inserted into the shaft bore 610.

It is understood that any portion of the valve body 600 can be machined after formation of the valve body 600. The machining can be accomplished using at least one subtractive manufacturing process, such as drilling, boring, broaching, etching (e.g., chemical etching), sanding, etc. In some examples, more than one machining process or other secondary or post manufacturing process can be used. It is further understood that any suitable machining process can be used to machine the portion of the valve body 600.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions can be implemented by, e.g., the same entity or object. Additionally, although individual features can be included in different examples or claims, these may possibly be combined, and the inclusion in different examples or claims does not imply that a combination of features is not feasible and/or advantageous.

Figure 7:
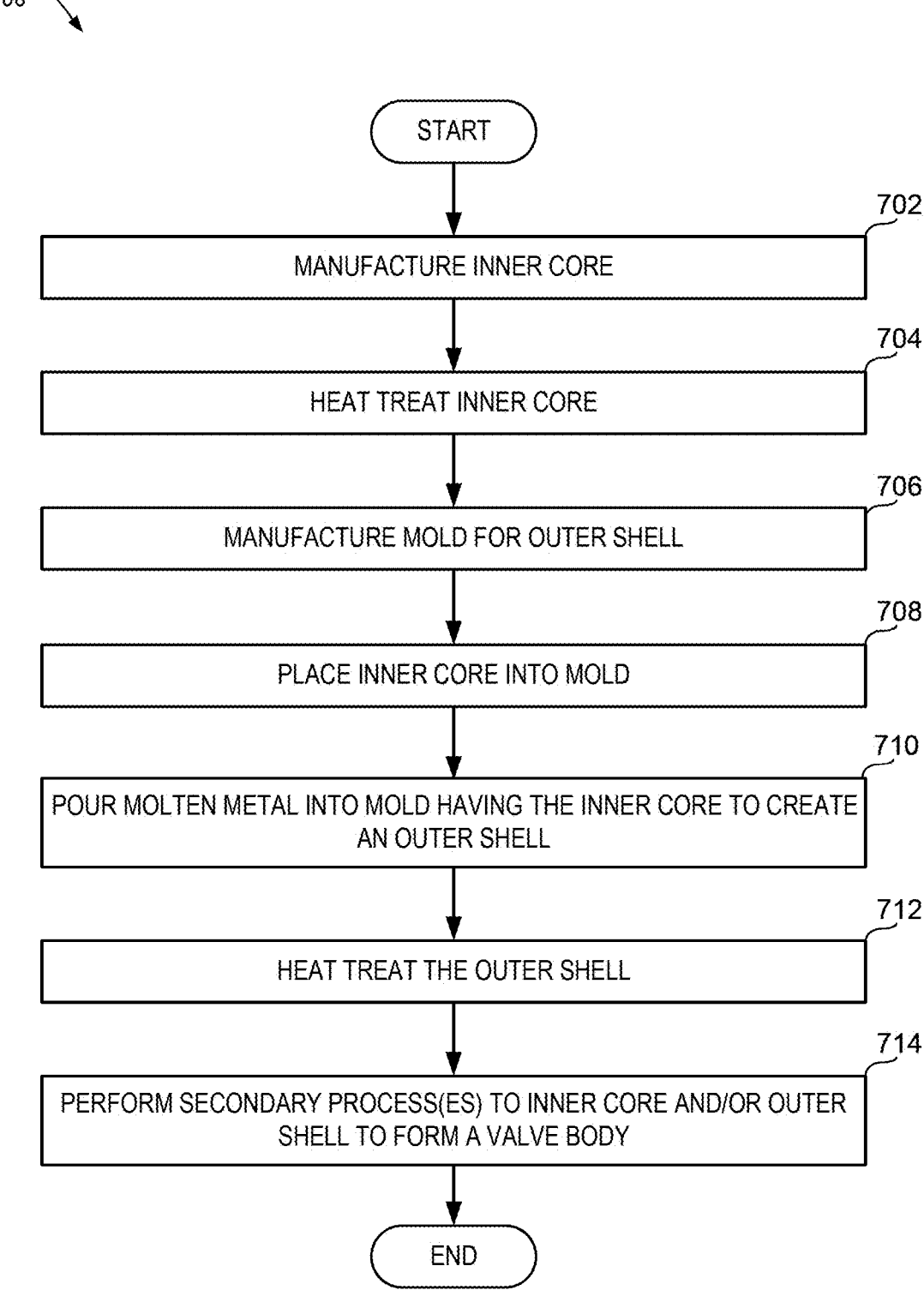
FIG. 7 is a flowchart diagram representative of an example method of manufacturing a valve body in accordance with teachings of this disclosure.

FIG. 7 is a flowchart representative of an example method 700 to manufacture an example valve body (e.g., the valve body 400, 600) disclosed herein. Specifically, the example method 700 can be used to form a valve body having an example inner core (e.g., the inner core 402, 602) and an example outer shell (e.g., the outer shell 404, 604) such as those described above with reference to FIGS. 4, 5 and/or 6. In some examples, the method 700 begins at block 702 at which the inner core 402, 602 is manufactured. For example, the inner core 402, 602 can be manufactured using an additive manufacturing process, such as a 3D metal printing process. The inner core 402, 602 can be manufactured using a first material having a desired wear resistant characteristic. For example, the inner core 402, 602 can be made using a nickel-based alloy for corrosion resistance, a cobalt-based alloy for corrosion and erosion resistance, and/or any other desired material(s). As noted above, the inner core defines an entire inner surface of a valve body. In some examples, the inner core defines wetted surfaces of the fluid flow passageway of the valve body.

At block 704, the inner core 402, 602 is heat treated to adjust the desired wear resistant characteristic and/or other material properties of the inner core. For example, the inner core 402, 602 can be placed into an oven and heated for a duration of time to alter the properties of the material. In some examples, an inner core 402, 602 manufactured using a nickel-based alloy can undergo a solution annealing heat treatment to meet mechanical property requirements set by a standards setting organization and/or to improve corrosion resistant properties. In some examples, an inner core 402, 602 manufactured using a cobalt-based alloy can undergo a solution annealing heat treatment (e.g., a secondary manufacturing process) to improve corrosion resistant properties of the inner core 402, 602 and/or to relieve internal stresses in the inner core 402, 602 that may result from the 3D printing process.

At block 706, a mold is manufactured to create the outer shell 404, 604. For example, the mold can be a sand cast mold for a casting process. In some such examples, the sand cast mold is manufactured using 3D printing process. The cast mold can include a gating system, including a pouring cup and gates.

At block 708, the inner core 402, 602 is placed into a cavity of the mold to manufacture the outer shell 404, 604 around the inner core 402, 602.

At block 710, a high-strength molten metal is poured into the mold having the inner core 402, 602 to manufacture the outer shell 404, 604. For example, the outer shell 404, 604 is overmolded with the inner core 402, 602 (e.g., via insert molding). For example, a carbon steel can be heated in a furnace to a melting point for carbon steel. The molten carbon steel is poured into the sand cast mold and dispersed around the inner core 402, 602 via the gating system. As the molten carbon steel cools, it solidifies around the inner core 402, 602. Further, because the inner core 402, 602 has a rough surface finish (e.g., as a result of the 3D printing process), the inner core 402, 602 and the outer shell 404, 604 bond together. As a result, the outer shell 404, 604 resulting from the casting process surrounds (e.g., completely surrounds, encompasses or encircles) the inner core 402, 602.

At block 712, the outer shell 404, 604 is heated treated. For example, the outer shell 404, 604 can be subjected to stress relieving, annealing, solution annealing, etc. Any suitable heat treatment can be applied to the outer shell 404, 604 to alter one or more material properties or characteristics of the outer shell 404, 604. For example, the outer shell 404, 604 can be annealed to remove stresses (e.g., from the casting process) and/or to improve ductility and/or other mechanical properties of the outer shell 404, 604.

At block 714, the inner core 402, 602 and/or outer shell 404, 604 are machined to create the valve body 400, 600. For example, the outer shell 404, 604 can be machined to achieve a desired valve body 400, 600 shape. In some examples, the inner core 402, 602 is machined to create a smooth gasket surface, to generate a shaft bore, etc.

From the foregoing, it will be appreciated that example systems, methods, apparatus, and articles of manufacture have been disclosed that enable manufacture of a valve body having a wear resistant inner core and high strength outer shell. Disclosed examples include the inner core, which has corrosion and/or erosion resistance. Disclosed examples enable the inner core to be small and/or complex in shape. Disclosed examples can increase life of the valve body in applications in which wear is a problem. Disclosed examples include an outer shell that acts as a pressure-temperature boundary barrier.

Example 1 includes a valve body comprising a metal core including a fluid inlet, a fluid outlet, and a fluid passageway extending between the fluid inlet and the fluid outlet, and an exterior shell overmolded with the metal core, the exterior shell bonded to the metal core, the exterior shell to provide a pressure-boundary of the valve body.

Example 2 includes the valve body of example 1, wherein the metal core is made of a first material having at least one of a first corrosion or erosion resistant characteristic and the exterior shell is made of a second material having at least one of a second corrosion or erosion resistant characteristic, wherein the first corrosion or erosion resistant characteristic is greater than the second corrosion or erosion resistant characteristic.

Example 3 includes the valve body of any of examples 1-2, wherein the metal core is made of at least one of a nickel-based alloy or a cobalt-based alloy.

Example 4 includes the valve body of any of examples 1-3, wherein a thickness of the metal core is homogenous.

Example 5 includes the valve body of any of examples 1-4, wherein the exterior shell is bonded to the metal core in at least a region of the valve body exposed to a process fluid.

Example 6 includes the valve body of any of examples 1-5, wherein the metal core is formed prior to formation of the exterior shell.

Example 7 includes the valve body of any of examples 1-6, wherein the exterior shell is formed around the metal core after formation of the metal core.

Example 8 includes the valve body of any of examples 1-7, wherein the exterior shell is cast around the metal core.

Example 9 includes a valve body comprising an inner core made of a first material, the inner core defining a flow path of the valve body between a first port and a second port, and an outer shell made of a second material different than the first material, the outer shell to surround the inner core, wherein the outer shell is bonded to the inner core, wherein the outer shell is bonded to the inner core after formation of the inner core.

Example 10 includes the valve body of example 9, wherein the first material is a nickel-based alloy.

Example 11 includes the valve body of example 9, wherein the first material is a cobalt-based alloy.

Example 12 includes the valve body of any of examples 9-11, wherein a thickness of the inner core varies around the valve body.

Example 13 includes the valve body of any of examples 9-12, wherein the thickness of the inner core is at least $3/16$ inch.

Example 14 includes the valve body of any of examples 9-13, wherein the second material has a greater strength relative to the first material.

Example 15 includes the valve body of any of examples 9-14, wherein the second material is a carbon steel.

Example 16 includes a method comprising manufacturing an inner core of a valve body using a first material, and overmolding an outer shell of the valve body with the manufactured inner core, the outer shell including a second material that is different than the first material.

Example 17 includes the method of example 16, wherein the manufactured inner core is placed into a mold, and wherein the outer shell is overmolded with the inner core by pouring molten metal into the mold having the inner core.

Example 18 includes the method of any of examples 16-17, further including applying a heat treatment to at least one of the inner core or the outer shell.

Example 19 includes the method of any of examples 16-18, further including applying a subtractive manufacturing process to at least one of the inner core and the outer shell.

Example 20 includes the method of any of examples 16-19, wherein the first material is at least one of a nickel-based alloy or a cobalt-based alloy and the second material is carbon steel.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method comprising:

forming a monolithic inner core of a valve body using a first material, the monolithic inner core defining a flow path of the valve body, the monolithic inner core having a thickness that varies between a first wetted portion of the flow path and a second wetted portion of the flow path different than the first wetted portion, the monolithic inner core to provide erosion and corrosion resistant characteristics against process fluids; and overmolding an outer shell of the valve body to the monolithic inner core, the outer shell including a second material different than the first material.

2. The method of claim 1, further including applying heat to at least one of the monolithic inner core or the outer shell.

3. The method of claim 1, further including applying a subtractive manufacturing process to at least one of the monolithic inner core or the outer shell.

4. The method of claim 1, wherein the overmolding includes providing molten metal to a mold after the monolithic inner core is positioned in the mold.

5. The method of claim 1, wherein the monolithic inner core is made of at least one of a nickel-based alloy or a cobalt-based alloy.

6. The method of claim 1, wherein the first wetted portion of the fluid flow passageway to be subjected to a greater amount of wear by a process fluid than the second wetted portion of the fluid flow passageway.

7. A method for forming a valve body, the method comprising:

forming a monolithic inner core defining a fluid flow passageway of the valve body, the fluid flow passageway having a thickness that varies between a first wetted portion of the fluid flow passageway and a second wetted portion of the fluid flow passageway different than the first wetted portion, the monolithic inner core composed of a first material having at least one of a first corrosion or erosion resistant characteristic;

positioning the monolithic inner core in a mold; and providing molten metal in the mold to form a monolithic exterior shell that encases the monolithic inner core, the monolithic exterior shell including a second material different than the first material, the second material having at least one of a second corrosion or erosion resistant characteristic, the first corrosion or erosion resistant characteristic greater than the second corrosion or erosion resistant characteristic.

8. The method of claim 7, further including forming the monolithic inner core via additive manufacturing.

9. The method of claim 7, wherein the fluid flow passageway of the monolithic inner core defines an entire fluid flow passageway of the valve body.

10. The method of claim 7, further including heat treating the monolithic inner core prior to positioning the monolithic inner core in the mold.

11. The method of claim 7, further including heat treating the monolithic exterior shell after formation of the monolithic exterior shell.

12. The method of claim 7, further including machining the monolithic inner core and the monolithic exterior shell after formation of the monolithic inner core and the monolithic exterior shell to form the valve body.

13. The method of claim 7, further including providing a rough surface finish on an outer surface of the monolithic inner core to improve bonding between the monolithic inner core and the monolithic exterior shell.

14. The method of claim 7, further including bonding the monolithic exterior shell to the monolithic inner core in at least a region of the valve body exposed to a process fluid.

15. A method comprising:

forming a monolithic insert made of a first material, the monolithic insert defining a flow path of a valve body between a first port and a second port, the flow path having an orifice between the first port and the second port, the orifice having a central axis that is non-parallel relative to a longitudinal axis of the first port and a longitudinal axis of the second port, the monolithic insert having a thickness that varies between a first wetted portion of the flow path and a second wetted portion of the flow path different than the first wetted portion, the first wetted portion adjacent the orifice such that the central axis of the orifice intersects the first wetted portion; and overmolding an outer shell to the monolithic insert, the outer shell made of a second material different than the first material.

16. The method of claim 15, further including forming the monolithic insert with a rough outer surface.

17. The method of claim 15, further including heat treating the outer shell after overmolding to the monolithic insert.

18. The method of claim 17, further including machining portions of the monolithic insert and the outer shell to shape the valve body.

19. The method of claim 15, wherein the first material is at least one of a nickel-based alloy or a cobalt-based alloy, and the second material is a carbon steel.

\* \* \* \* \*